Figure 1:
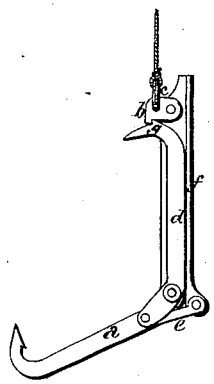
Figure 2:
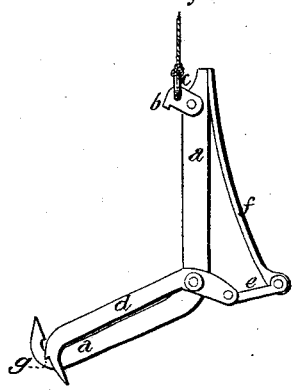

E. L. DUNLAP.
Fish-Hooks.

No. 163,980. Patented June 1, 1875.

WITNESSES
CW Lemon
JW Lamer

INVENTOR
Ephraim L. Dunlap
per F. A. Lehmann
Att'y

THE GRAPHIC CO. PHOTO-LITH. 39 & 41 PARK PLACE, N.Y.

UNITED STATES PATENT OFFICE.

EPHRAIM L. DUNLAP, OF EUSTIS, MAINE.

IMPROVEMENT IN FISH-HOOKS.

Specification forming part of Letters Patent No. 163,980, dated June 1, 1875; application filed May 1, 1875.

*To all whom it may concern:*

Be it known that I, E. L. DUNLAP, of Eustis, in the county of Franklin and State of Maine, have invented certain new and useful Improvements in Fish-Hooks; and I do hereby declare the following to be a full, clear, and exact description of the invention, such as will enable others skilled in the art to which it pertains to make and use it, reference being had to the accompanying drawings, which form part of this specification.

My invention relates to that class of fish-hooks in which the fish are securely held upon the main baited hook by means of a secondary spring-hook connected therewith; and it consists in the combination and arrangement of the main hook, having a secondary spring-hook pivoted thereto, with a pivoted swinging catch arranged to engage with the spring-hook, and connected with the fishing-line, all as hereinafter set forth and claimed.

The accompanying drawing represents my invention.

$a$ represents a fish-hook. At the side of the upper end or shank of the hook $a$ is pivoted a catch, $b$, through which passes a ring, $c$, to attach the fishing-line. The lever $d$, of which the longer arm terminates in a downward-pointing hook, is pivoted to the bend in the hook $a$, and its shorter arm is connected by means of the rod $e$ with the lower end of the spring $f$, of which the other end is secured at the rear of the top of the shank $a$. A small projection, $g$, near the point of the hook of the lever $d$ fastens under the catch $b$, by which the lever, when bent backward, is temporarily held.

The bait is placed upon the hook $a$, and the effort of the fish to get away, after swallowing the bait, jerks the lever from under the catch, when, propelled by the spring, the lever is rapidly brought down, its hook striking into the head of the fish, while the hook $a$ fastens within the mouth.

Having thus described my invention, I claim—

The main hook $a$, secondary spring-hook, and spring $d$ $g$ $e f$, arranged and connected therewith, as shown, in combination with the swinging catch $b$, pivoted to the shank of the main hook $a$, all constructed and arranged substantially as shown and set forth.

In testimony that I claim the foregoing, I have hereunto set my hand this 26th day of April, 1875.

EPHRAIM L. DUNLAP.

Witnesses:
 TIMOTHY STONE,
 AUGUSTUS BRADBURY.